Patented Sept. 27, 1938

2,131,313

UNITED STATES PATENT OFFICE 2,131,313

MAKING ZINC PIGMENT

Henry Seymour Colton, Shaker Heights, Ohio

No Drawing. Application May 24, 1937,
Serial No. 144,562

10 Claims. (Cl. 23—135)

This invention relates to making zinc pigments; and it comprises an improvement in processes of recovering zinc in pigmentary form from sal skimmings and crude impure zinciferous materials generally by extraction with ammoniacal-carbonate solutions wherein the ammoniacal solution at one stage in the operation is treated with a phosphate to precipitate manganese as ammonium manganese phosphate insoluble in the ammoniacal liquid; and more specifically it relates to a process of recovering zinc sulfide in a state of sufficient purity for pigmentary purposes wherein the sal skimmings are first extracted by ammoniacal ammonium carbonate solution including recycled liquor, in the presence of some lime, the liquid is separated from the insoluble bodies, is boiled to precipitate zinc oxy-carbonate with recovery of ammonia and excess $CO_2$, the precipitate is separated from a mother liquor containing chlorides and other impurities, is redissolved in ammoniacal ammonium carbonate solution, a little phosphate added to the solution to precipitate manganese and zinc is recovered as a substantially chlorine-free and manganese-free zinc sulfide by addition of a soluble sulfide, best ammonium sulfide or hydrogen sulfide, the mother liquid being recycled for use in the first stated operation; all as more fully hereinafter set forth and as claimed.

In the recovery of zinc from waste material, such as the waste materials produced in the galvanizing industry and known as galvanizer's waste, sal skimmings, dry skimmings, zinc ashes, etc., and from crude zinciferous materials generally, one of the many methods that have been used is the extraction of the material with an ammoniacal solution of ammonium carbonate. Such a solution is advantageous as an extraction agent because of its power of dissolving zinc oxide while leaving undissolved various impurities, such as alumina and iron oxide, silica and compounds of the various heavy metals (Fe, Ni, Cu, Mn, etc.). There is often some little difficulty in securing a wholly complete separation of the heavy metals in this operation. Traces of other metals than zinc going forward may impair pigmentary values considerably. This is particularly true as regards manganese compounds which tend to discoloration in air.

Extreme purity, at least as regards certain foreign bodies, is required in a good and permanent zinc pigment. For some reason, even the presence of chlorides in such a pigment is harmful.

In the use of ammoniacal ammonium carbonate solution for extracting sal skimmings, etc. with precipitation of the zinc as oxy-carbonate by boiling the liquor, it is found in practice that the oxy-carbonate carries enough chloride to be objectionable. And the presence of manganese, which often occurs, is also harmful.

In a prior and copending application Serial No. 92,235, I have described and claimed a cyclic process of recovering zinc values on which, in some aspects, the present invention is an improvement. In the process of the prior application waste skimmings containing chlorides are extracted with ammoniacal ammonium carbonate solution in the presence of sufficient lime to react with the chlorides and form calcium chloride. After separation of insoluble impurities, the extract liquor is boiled to drive off $CO_2$ and ammonia, which are recovered, with separation of zinc oxy-carbonate. The oxy-carbonate is separated, the mother liquor carrying considerable soluble impurity being discarded. The precipitate is redissolved in ammoniacal ammonium carbonate solution, giving a further separation of insolubles which go out of the system. The new solution is boiled to re-precipitate zinc oxy-carbonate which is filtered off or otherwise separated, the mother liquor being recycled; being added to the ammoniacal solution used in extracting further quantities of the sal skimmings. This cyclic process represents certain economies in heat and materials, and has the further outstanding advantage in that the oxy-carbonate recovered in the second precipitation is substantially pure, being in particular practically free of chlorine. It is useful in making zinc pigments and other zinc preparations.

It is now my discovery that in such a process the operation is facilitated and purer products obtained by adding a small quantity of a soluble phosphate, such as ammonium phosphate or sodium phosphate, to the ammoniacal zinc solution, advantageously the second solution: that resulting from the solution of the first oxy-carbonate precipitate. In particular, this addition serves to precipitate the manganese in the form of a phosphate insoluble in the ammoniacal liquid. Most manganous compounds are more or less soluble in an excess of ammonium carbonate but ammonium manganese phosphate is an exception. The fact is utilized in the present invention.

By filtering out the manganese precipitate, the second zinc precipitation from the ammoniacal carbonate solution gives a material which is not only chlorine-free but also manganese free. This removal of manganese is useful in the process of the prior application where there is a double precipitation of oxy-carbonate but it is now also useful in modified processes where the redissolved oxy-carbonate of the first precipitation is converted into pigmentary zinc sulfide by an addition of a soluble sulfide. In so doing, any soluble sulfide may be employed as a precipitant. If barium sulfide be used, the zinc sulfide then carries barium carbonate which has pigmentary value.

In practice of the cyclic process, the first stage or extraction-digestion of the crude material in ammoniacal ammonium carbonate solution with addition of lime effects a substantially complete solution of the zinc oxide compounds in the material treated. Filtration separates insoluble impurities existing as heavy metal compounds together with silica and alumina and excess lime. The subsequent boiling of the filtrate with precipitation of zinc oxy-carbonate and recovery of the ammonia and excess $CO_2$ leaves nearly all of the soluble chlorides and other soluble impurities in solution which is discarded. The precipitated zinc oxy-carbonate has only a small content of chloride. The re-solution of this precipitate in ammoniacal carbonate gives a further separation of insoluble impurities and any zinc which remains insoluble in the re-solution step is recovered by the return of the insoluble matter to be extracted in the first digestion step. As I have found, manganese if present has a tendency to accompany the zinc in the several extraction and precipitation steps. But I find that a selective precipitation of manganese and separation from the zinc is effected by the addition of a small amount of ammonium or sodium phosphate to the circulating liquid system. The complex ammonium manganese phosphate is, advantageously, precipitated by the phosphate addition with the insoluble impurities remaining from the re-solution of the first precipitate in ammoniacal carbonate. However, if desired, it may be precipitated and removed separately. The second oxy-carbonate of zinc solution, upon addition thereto of ammonium or sodium sulfide, yields a pure white zinc sulfide precipitate substantially chloride-free and also free of heavy metal compounds. The process is operated to insure a substantially complete separation of iron in the ferric form as insoluble compounds; the phosphate addition aiding in this separation. In the final precipitation of zinc sulfide from the purified filtrate derived from the second extraction by ammoniacal carbonate, it is unnecessary to effect a wholly complete precipitation of the zinc content of the solution. Any zinc remaining in the mother liquor after precipitation is returned to the first digestion or extraction step of the process and is recovered. The soluble impurities in this mother liquor, including salts of metals resulting from the sulfide precipitation, are also returned to the digestion and are discarded with the filtrate obtained after the first precipitation of zinc oxy-carbonate. In the process the insoluble impurities are separated and discarded in the first extraction and the soluble impurities, particularly chlorides, are discarded in the filtrate liquor remaining after the first precipitation.

I find that the addition to the cyclic system of small amounts of soluble phosphate aids materially in the purification of the zinc product. When the soluble phosphate is added to the second ammoniacal carbonate extract prior to the second precipitation of zinc either as oxy-carbonate or as sulfide, I have found that it is often not necessary to filter off the ammonium manganese phosphate precipitate. This white substance may be allowed to remain with the zinc precipitate without adverse discoloration effect. In practice however it is usually advantageous to add phosphate during the second extraction step and to separate insoluble phosphate precipitate from the ammoniacal carbonate zinc solution. The second precipitation step of the cyclic process in which the zinc is precipitated as zinc sulfide yields a product of unusual purity and stability as a pigment.

As a method of making zinc sulfide from crude zinc raw materials generally, the process of extracting the oxide in an ammoniacal carbonate solution and precipitating zinc sulfide from such a solution has great economic advantage over prior processes in which zinc salts of strong mineral acids such as the sulfate are treated in solution with sulfides and quantities of by-product salts formed in the reaction have to be disposed of. By using ammonium sulfide or hydrogen sulfide as the zinc precipitant in the present process, ammonia and ammonium carbonate are recovered and cyclically reused. When sodium sulfide is the precipitant, soda is removed with the solubles by return of the liquid for cyclic use in extracting zinc crudes.

The separation effected between zinc and manganese in ammoniacal carbonate solution by addition of phosphate is a valuable feature in the extraction of crude materials generally.

What I claim is:

1. A process of making zinc sulfide for pigments from crude zinc materials, which comprises extracting the material with a solution of ammonium carbonate and ammonia, boiling the solution extract to precipitate zinc oxy-carbonate, redissolving the precipitate in ammoniacal ammonium carbonate solution with addition of a soluble phosphate and precipitating zinc sulfide from said solution by addition of a soluble sulfide.

2. A process of converting chloride-containing zinc compounds into a substantially chloride-free zinc sulfide which comprises treating the chloride compound with an ammoniacal ammonium carbonate solution with addition of lime to dissolve zinc compounds, discarding insoluble matter, boiling the solution to precipitate zinc oxy-carbonate separating the precipitate with discard of soluble matter and redissolving it in ammoniated ammonium carbonate solution with separation of insoluble matter and precipitating zinc sulfide from this solution by addition thereto of a soluble sulfide.

3. In a process of recovering zinc compounds from crude zinciferous materials containing manganese compounds wherein zinc compounds are first extracted by an ammoniacal solution, precipitated by boiling the solution extract, re-extracted in an ammoniacal solution and reprecipitated, the improvement which comprises adding a soluble phosphate to the second ammoniacal zinc solution.

4. In obtaining from impure chloride-containing zinciferous material substantially pure zinc sulfide, a cyclic process which comprises extracting the material with ammoniacal ammonium carbonate solution with an addition of lime converting chlorides of the material to calcium chloride and with discard of insoluble matter, boiling the extract to recover ammonia and to precipitate zinc oxy-carbonate, discarding chloride-containing liquor, redissolving the precipitate in ammoniacal ammonium carbonate solution with separation and recycling of insoluble matter, adding to this second solution a soluble sulfide to precipitate substantially pure zinc sulfide and recycling the liquor from the precipitation to the first ammoniacal extraction of impure materials.

5. In the process of claim 4, adding a soluble phosphate to the re-solution of zinc oxycarbonate in ammoniacal ammonium carbonate solution.

6. In the recovery of zinc from zinciferous materials as commercial pigments the process of obviating the effects of manganese compounds when present which comprises adding a small amount of phosphate to an ammoniacal solution of zinc, the amount being about that sufficient to precipitate the manganese present.

7. In the process of claim 6, removing the manganese precipitate and converting the zinc into zinc sulfide.

8. In a cyclic process of recovering zinc values from impure materials by a double extraction in ammoniacal carbonate solution and reprecipitation with discard of insoluble impurities at one point in the cycle and of dissolved impurities at another point, the improvement which comprises adding a soluble phosphate to one of said ammoniacal carbonate solution extracts to aid in removal of the insoluble impurities and recovering pigment zinc sulfide by adding a soluble sulfide for the reprecipitation from the second ammoniacal carbonate extract.

9. In processes of extracting zinc values from crude manganiferous materials with extraction by an aqueous ammoniacal carbonate solution, the improvement in recovering a pure zinc product which comprises adding a soluble phosphate to said zinc solution in about the amount required to precipitate the manganese and removing the insoluble manganese ammonium phosphate thereby formed.

10. In the process of claim 2, precipitating zinc sulfide from the second ammoniacal ammonium carbonate solution by addition thereto of ammonium sulfide.

HENRY SEYMOUR COLTON.